Sept. 16, 1958     H. MAGNUSKI     2,852,730

POWER SUPPLY

Filed Sept. 23, 1955

INVENTOR.
Henry Magnuski
BY
Mueller and Aichele
Attys.

United States Patent Office 2,852,730
Patented Sept. 16, 1958

2,852,730

POWER SUPPLY

Henry Magnuski, Glenview, Ill., assignor to Motorola, Inc., Chicago, Ill., a corporation of Illinois Application September 23, 1955, Serial No. 536,215

5 Claims. (Cl. 321—2)

This invention relates generally to power supply systems and more particularly to a system for converting a low direct current potential to a higher direct or alternating current potential.

In operating various types of electronic equipment it is often necessary to employ a source of comparatively high direct current voltage of the order of 100 volts or more. In the case of portable equipment, it sometimes requires the use of a generator or a large set of batteries. Another known method of obtaining high voltage direct current, when an alternating current supply is not available, is that of converting a low voltage direct current to alternating current or pulsating direct current which is then stepped up in a transformer after which it may be rectified to furnish the required high voltage. However, many known systems of the latter type have been of low efficiency and of rather poor reliability, as well as somewhat bulky and expensive.

Accordingly, it is an object of this invention to provide voltage conversion apparatus of inexpensive construction which requires but few component parts of comparatively small size and weight.

Another object of the invention is to provide a reliable low power voltage conversion system which operates with greatly improved efficiency.

A feature of the invention is the provision of a low voltage electron oscillator including a feedback and high voltage transformer having an input winding and a feedback winding coupled through a saturable core portion and a high voltage output winding coupled to the input winding through an unsaturable core portion to provide highly efficient transformer coupling.

Another feature of the invention is the provision of a transformer for a low voltage dual transistor square wave oscillator having a feedback winding coupled to an input winding by a core of reduced cross sectional area as compared to another core portion coupling the input winding to an output or high voltage winding which feeds a rectifier circuit for supplying a high voltage direct current from the signal generated by the oscillator. By such construction alternate conduction of the transistors by sharp, abrupt switching may be obtained thus improving efficiency and operation of the transistor oscillator.

Further objects, features and the attending advantages thereof will be apparent upon consideration of the following description when taken in conjunction with the accompanying drawing in which.

In practicing the invention there is provided a power supply or voltage converting system for transforming a relatively low direct current potential to one or more other alternating current or direct current potentials. The system includes an oscillator formed by a pair of electron discharge devices, preferably transistors, operating on relatively low voltage. The electron devices are coupled to an input and a feedback winding of a transformer to form an oscillator circuit which relies on saturation of a first portion of the transformer core for making these devices alternatively conductive. The square wave signal produced by such alternate conduction is applied from the input winding to the high voltage winding by a second core portion which does not saturate during operation. Accordingly, abrupt alternate conduction of the discharge devices is obtained as the first core portion saturates and further increase in magnetic flux in the transformer is diverted to the second core portion. Thus reduced magnetizing current is used in the transformer and highly efficient operation is possible with the single feedback and high voltage transformer. A full wave rectifier circuit coupled to the high voltage winding is usually used to provide a direct current output of high potential for any desired purpose.

Figure 1:
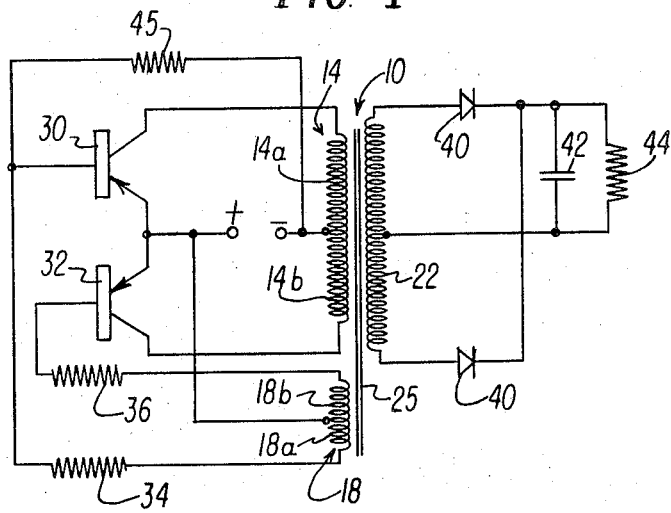
Fig. 1 is a schematic diagram of a power supply system.

The circuit of Fig. 1 shows a power supply system including a transformer 10 having an input winding 14 and a feedback winding 18. Transformer 10 is also shown including one output or high voltage winding 22 and a core 25 magnetically coupling windings 14, 18 and 22 together. A low voltage direct current potential is applied between a center tap of winding 14 and the input to electron discharge devices 30, 32. Electron discharge devices or transistors 30 and 32 are illustrated as the p-n-p type, with their emitters coupled together and to the positive terminal of the low voltage potential source. The collectors thereof are connected respectively to the ends of input winding 14. It may also be seen that a center tap of winding 18 is connected to the emitters and that the end terminals of this winding are coupled respectively through resistors 34, 36 to the bases of transistors 30, 32. A starting resistor 45 is connected between the negative low voltage terminal and the base of transistor 30. Rectifier diodes 40 are connected between end terminals of high voltage winding 22 and one terminal of filter capacitor 42. The other terminal of capacitor 42 is connected to a center tap of winding 22, and a load, represented by resistor 44, is shown coupled across capacitor 42.

Having thus described the connection of the circuit shown in Fig. 1 the operation thereof will now be explained. As the system commences operation one of the transistors will generally conduct somewhat greater current than the other due to any unbalanced condition in the circuit and its components, and such conduction will tend to increase while at the same time there will be a tendency to cut off the other transistor. However, to insure a prompt start of oscillation, resistor 45 is added, which together with resistor 34 constitutes a voltage divider and causes the base of transistor 30 to be somewhat negative with respect to the emitter of transistor 30. This insures a definitely larger current flowing through the collector of this transistor. If this resistor were not added, both transistors having bases at the same potential as their emitters would draw very small, and possibly equal, current through the collectors and oscillation may never start.

Transistor 30 conducting current flow through portion 14a of input winding 14 will induce a potential across portion 18b of feedback winding 18 tending to drive the potential of the base of transistor 32 in a positive direction thus tending to cut off transistor 32 at the same time a potential induced in portion 18a will tend to bias the base of transistor 30 negatively thus increasing the conduction therein. Thus the magnetic coupling between windings 14 and 18 will tend to further the action just described, namely that of increasing the conduction of transistor 30 and maintaining transistor 32 cut off until transistor 30 is fully conductive and transistor 32 is completely cut off. Resistors 34 and 36 limit the current through transistor bases to a reasonable value and thus tend to equalize the conduction of both transistors.

The current flowing through winding 14a and the collector of transistor 30 is composed of two portions. One is a load current, providing the same ampere turns as the load resistor 44 draws from winding 22 through diode 40 and may be considered constant (i. e. during the half cycle of the oscillation when transistor 30 is conductive). The other portion is the magnetizing current which increases continuously since the flux in the transformer has to increase continuously to induce the potentials in all the windings. This magnetizing current may first increase slowly and linearly and then rather fast when the saturation knee on the magnetizing curve of the transformer is approached.

If transformer 10 were of the usual construction, with tight couplings between all the windings, then this magnetizing current would increase until it were a sizable portion of the total current flowing through winding 14a and the collector of transistor 30, and until the knee of the transistor $E_c I_c$ curve is reached. At this time, the transistor cannot provide any more current and the induced potential across all the windings disappears. Disappearance of the potential across winding 18a causes the base of transistor 30 to be less negative as compared to the emitter and thus transistor 30 becomes less conductive. This decreases the magnetizing current and the collapsing flux induces the opposite potentials in all windings. The potential induced in winding 18b causes transistor 32 to be conductive, while the potential induced in winding 18a cuts off transistor 30. This second half of the oscillating cycle continues until the time when the magnetizing current increases to such a proportion that transistor 32 is not able to deliver it. Then a reverse occurs again.

It should be apparent from the description above that transistors 30, 32 will alternately conduct through input winding 14 and that an alternating current potential will be produced across high voltage winding 22 to be rectified by diodes 40, filtered by capacitor 42 and applied as a direct current potential to load resistance 44. However, it should also be apparent to those skilled in the art that operation of the system as described would require considerable magnetizing current for the core 25 and that the system might be inefficient because such large magnetizing current would not only cause large loss of energy in the resistance of the transformer input winding and hysteresis loss in the transformer core, but also the increased voltage drop between collector and emitter of the conductive transistor would increase the heat dissipation in the transistor and limit its output power and efficiency.

Figure 2:
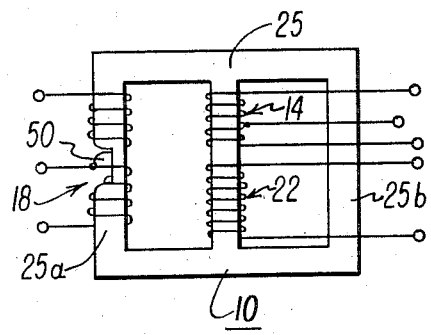
Fig. 2 is a diagram illustrating a transformer construction to obtain the improved results provided by the present invention.

Accordingly, transformer 10 is constructed as shown in Fig. 2 in order to increase the efficiency of the system and to provide sharp and rapid alternate conduction of the transistors 30, 32. Windings 14 and 22 are mounted adjacent one another on a common portion of the core 25. The feedback winding 18, on the other hand, is mounted on a separate leg 25a of the core 25 which is provided with an under cut 50, or portion of reduced cross sectional area. A further magnetic path is provided by leg 25b which is effectively in parallel with leg 25a as far as the magnetic flux in the core 25 is concerned. Accordingly, as the current flow is increasing through either transistor 30 or 32, saturation of leg 25a will occur positively and rather abruptly due to the undercut thereof and the total magnetizing current can be small so the transformer will provide increased efficiency. Furthermore, the magnetic flux originally starting to flow in both legs 25a and 25b due to the current flow in the input winding 14 will, upon saturation of leg 25a, be carried in leg 25b so that the saturation knee in a B/H diagram, of the saturation curve of this core, will be sharp like that obtained with high quality core iron.

Thus there will be a sharp and distinct switch in conduction between the two transistors 30, 32.

As soon as saturation in leg 25a is reached, no potential will be induced in winding 18a, thus the base of transistor 30 will cease to be negative causing rapid decrease in conductivity of this transistor. This will decrease the current in winding 14a and will switch the conductivity to transistor 32 as previously described. A significant improvement in operation results since the switching in conductivity occurs due to decreased base potential and not due to transistor overloading.

This invention provides therefore, a system for converting a single low voltage direct current potential to some other direct current or alternating current potential, for example a high voltage direct current potential, with improved efficiency. It should also be pointed out that filtering of the rectified square wave is quite efficient since filter capacitor 42 need discharge into the load only during the short periods when the square wave switches from positive to negative output. Since there is rapid and abrupt switch over in the described system this time period is very short and filtering action is improved. Furthermore, only a single transformer is utilized for both the feedback and high voltage functions. Thus, the expense of construction is reduced at the same time permitting the apparatus to be compactly assembled in a form of reduced weight over systems requiring separate transformers to provide these functions. The exact efficiency of any system constructed in accordance with the invention would depend upon various factors including the input voltage and the output power derived from the system but it has been possible in practical constructions of the apparatus described to realize an overall efficiency substantially above 90%. The invention provides therefore, a highly satisfactory power supply system.

I claim:

1. A power supply system including in combination, a low voltage square wave oscillator circuit including a pair of electron discharge devices, a transformer having a core structure and input and feedback windings and an output winding provided on said core structure, said feedback winding being supported on a portion of said core structure of reduced cross section which saturates in response to magnetizing current in said input winding to cause alternate conduction of said electron discharge devices, said input winding being coupled to said output winding to induce a signal from said oscillator circuit in said output winding by a portion of said core structure of such cross section that it does not saturate by magnetizing current in said input winding, and utilization means connected to said output winding to use the signal induced therein.

2. A power supply system including in combination, a transformer having an input winding, a feedback winding, and a high voltage winding, said transformer also having intercoupled magnetic coupling paths including a first path inductively coupling said input and feedback windings and a second path inductively coupling said high voltage winding with said input winding, a pair of transistor devices coupled in alternately conducting relation with said input and feedback windings, said first path being of such construction to saturate by a given current conducting condition of said transistor devices thereby causing the same to conduct alternately, and said second path being of such construction that it remains unsaturated at such given conducting condition so that said second path is unsaturated as a signal is developed in said high voltage winding, and rectifier means coupled to said high voltage winding to rectify the signal developed therein and to provide direct current power from said system.

3. A power supply system including in combination, a transformer having an input and feedback windings and a high voltage winding, said transformer also having intercoupled magnetic core paths including a first core path inductively coupling said input and feedback windings and a second core path inductively coupling said high voltage winding with said input winding, transistor electron discharge means coupled in oscillatory relation with said input and feedback winding, said first core path having a portion of lesser cross sectional area than that of said second core path so that said first core path is saturable by a given current conducting condition of said electron discharge means and said second core path is unsaturable at such given conducting condition, the conducting condition of said electron discharge means providing alternate conduction and non-conduction of said electron discharge means and an oscillartory signal in said output winding, and rectifier means coupled to said high voltage winding to rectify the signal developed therein and to provide direct current power from said system.

4. A power supply system including in combination, a transformer having input and feedback windings and an output winding, said transformer also having core means including a first core portion inductively coupling said input and feedback windings and a second core portion inductively coupling said output winding with said input winding, a pair of transistors coupled in oscillatory relation with said input and feedback windings, said first core portion being intermittently saturable by current flow through said transistors individually thereby causing alternate conduction thereof and said second core portion being unsaturable thereby so that a square wave oscillatory signal may be developed in said output winding without saturation of said second core portion, and rectifier means coupled to said output winding to rectify the signal developed therein and to provide direct current power from said system.

5. A square wave oscillator circuit including in combination, a pair of electron discharge devices, a transformer having a first core portion with an input winding supported thereon, said transformer further having a second core portion and a feedback winding supported thereon and inductively coupled in said input winding, said second core portion being constructed to saturate in response to a given magnetizing current in said input winding at which said first core portion remains unsaturated thereby causing alternate conduction of said discharge devices, and utilizing means coupled to said output winding to use the signal from said oscillator circuit.

References Cited in the file of this patent

UNITED STATES PATENTS

| | | |
|---|---|---|
| 1,987,730 | Cravath | Jan. 15, 1935 |
| 2,382,615 | Donley | Aug. 14, 1945 |
| 2,608,860 | Ramey et al. | Sept. 2, 1952 |
| 2,748,274 | Pearlman | May 29, 1956 |